United States Patent
Reial et al.

(10) Patent No.: US 12,317,226 B2
(45) Date of Patent: May 27, 2025

(54) PAGING A USER EQUIPMENT BY A NETWORK NODE

(71) Applicant: Telefonaktiebolaget LM Ericsson (publ), Stockholm (SE)

(72) Inventors: Andres Reial, Höllviken (SE); Sina Maleki, Malmö (SE); Ali Nader, Malmö (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 393 days.

(21) Appl. No.: 17/782,812

(22) PCT Filed: Dec. 10, 2019

(86) PCT No.: PCT/EP2019/084404
§ 371 (c)(1),
(2) Date: Jun. 6, 2022

(87) PCT Pub. No.: WO2021/115568
PCT Pub. Date: Jun. 17, 2021

(65) Prior Publication Data
US 2023/0007625 A1  Jan. 5, 2023

(51) Int. Cl.
*H04W 68/02* (2009.01)
*H04W 16/28* (2009.01)

(52) U.S. Cl.
CPC ........... *H04W 68/02* (2013.01); *H04W 16/28* (2013.01)

(58) Field of Classification Search
CPC ...... H04W 68/02; H04W 16/28; H04W 68/00
See application file for complete search history.

(56) References Cited

U.S. PATENT DOCUMENTS

| 10,638,331 B2* | 4/2020 | Ryoo ................. H04B 7/0617 |
| 11,881,928 B2* | 1/2024 | Gineste .............. H04B 7/18504 |

(Continued)

FOREIGN PATENT DOCUMENTS

| CN | 108521879 A | 9/2018 |
| CN | 110167141 A | 8/2019 |

(Continued)

OTHER PUBLICATIONS

OPPO, "paging capacity issue in NR", 3GPP TSG-RAN2#102, R2-1806952, Busan, Korea, May 21-25, 2018, 1-4.

*Primary Examiner* — Santiago Garcia
(74) *Attorney, Agent, or Firm* — Weisberg I.P. Law, P.A.

(57) ABSTRACT

A method is disclosed of paging a user equipment (UE) by a network node. The network node is configured for beamformed transmission of a plurality of beams, wherein each beam is associated with a corresponding synchronization signal block (SSB), and wherein a physical downlink control channel (PDCCH) paging monitoring occasion (PMO) is associated with a preceding SSB. The method comprises determining (while the UE is in a non-connected mode) a subset of the plurality of beams related to one or more beams previously associated with the UE, transmitting the corresponding SSB for each beam of the plurality of beams, and paging the UE only in PDCCH PMO:s associated with the corresponding SSB:s of the beams of the subset. Corresponding apparatus, network node and computer program product are also disclosed.

13 Claims, 2 Drawing Sheets

(56) References Cited

U.S. PATENT DOCUMENTS

| | | | | |
|---|---|---|---|---|
| 2018/0026698 A1* | 1/2018 | Lee | ............... | H04B 7/043 |
| | | | | 370/335 |
| 2018/0027522 A1* | 1/2018 | Lee | ............... | H04W 72/21 |
| | | | | 370/336 |
| 2019/0058538 A1* | 2/2019 | Sun | ............... | H04W 56/001 |
| 2019/0069271 A1* | 2/2019 | Reial | ............... | H04W 68/02 |
| 2019/0089499 A1* | 3/2019 | Nam | ............... | H04W 4/06 |
| 2019/0230529 A1* | 7/2019 | Sadiq | ............... | H04L 5/006 |
| 2019/0341984 A1* | 11/2019 | Zhu | ............... | H04B 7/0639 |
| 2019/0364390 A1* | 11/2019 | Kurras | ............... | H04W 16/28 |
| 2020/0059799 A1* | 2/2020 | Suzuki | ............... | H04B 7/06964 |
| 2020/0136709 A1* | 4/2020 | Wang | ............... | H04B 7/0695 |
| 2020/0137714 A1* | 4/2020 | Kumar | ............... | H04W 4/024 |
| 2020/0287609 A1* | 9/2020 | Lee | ............... | H04B 7/0695 |
| 2020/0305232 A1* | 9/2020 | Miao | ............... | H04W 68/02 |
| 2021/0143889 A1* | 5/2021 | Akoum | ............... | H04B 7/0417 |
| 2021/0258064 A1* | 8/2021 | Yu | ............... | H04B 7/086 |
| 2021/0321359 A1* | 10/2021 | Kumar | ............... | G01S 5/0236 |

FOREIGN PATENT DOCUMENTS

| | | |
|---|---|---|
| CN | 110226351 A | 9/2019 |
| WO | 2018144873 A1 | 8/2018 |
| WO | 2018175442 A1 | 9/2018 |
| WO | 2019099661 A1 | 5/2019 |

* cited by examiner

PAGING A USER EQUIPMENT BY A NETWORK NODE

TECHNICAL FIELD

The present disclosure relates generally to the field of wireless communication. More particularly, it relates to paging of a user equipment (UE) by a network node of a wireless communication network.

BACKGROUND

Generally, when a user equipment (UE) is referred to herein, it should be understood to encompass any terminal device suitable for communication in relation to a wireless communication network (e.g., a user equipment—UE, an Internet of Things—IoT—device, a station—STA, etc.).

Signaling related to paging of a terminal device in a wireless communication network generally uses resources (e.g., time resources, frequency resources, etc.) that could otherwise have been used for signaling other than paging (e.g., data signaling).

Furthermore, paging is—in many wireless communication networks—transmitted in specified paging resources (e.g., paging occasions), which may typically be reserved regardless of whether or not they are actually being used for paging.

Thus, paging signaling and reservation of paging resources typically increase signaling overhead and reduce throughput in a wireless communication network. These drawbacks typically become increasingly prominent when the number of terminal devices in a wireless communication network increases.

Therefore, there is a need for alternative approaches to paging of a terminal device in a wireless communication network. Preferably, such approaches provide improved (e.g., decreased) signaling overhead and/or improved (e.g., increased) throughput.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method of paging a user equipment (UE) by a network node, wherein the network node is configured for beam-formed transmission of a plurality of beams, wherein each beam is associated with a corresponding synchronization signal block (SSB), and wherein a physical downlink control channel (PDCCH) paging monitoring occasion (PMO) is associated with a preceding SSB.

The method comprises determining—while the UE is in a non-connected mode—a subset of the plurality of beams related to one or more beams previously associated with the UE, transmitting the corresponding SSB for each beam of the plurality of beams, and paging the UE only in PDCCH PMO:s associated with the corresponding SSB:s of the beams of the subset.

In some embodiments, the method further comprises acquiring—while the UE is in a connected mode—information indicative of one or more beams associated with the UE, and using the information to determine the subset.

In some embodiments, acquiring information indicative of one or more beams associated with the UE comprises receiving an access request from the UE, wherein the access request is associated with the corresponding SSB of the one or more beams associated with the UE.

In some embodiments, acquiring information indicative of one or more beams associated with the UE comprises receiving a measurement report from the UE, wherein the measurement report indicates the one or more beams associated with the UE.

In some embodiments, the method further comprises monitoring reception of paging response from the UE, and—when no paging response is received—paging the UE in one or more PDCCH PMO:s associated with corresponding SSB:s of the beams of the plurality not comprised in the subset.

In some embodiments, the method further comprises determining whether the beams previously associated with the UE fulfill a reliability condition, and performing the paging in relation to the subset responsive to the beams previously associated with the UE fulfilling the reliability condition.

In some embodiments, the method further comprises determining whether a paging priority and/or a paging latency requirement allows a paging latency which exceeds a latency threshold value, and performing the paging in relation to the subset responsive to the paging priority and/or the paging latency requirement allowing the paging latency exceeding the latency threshold value.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for paging a user equipment (UE) by a network node, wherein the network node is configured for beam-formed transmission of a plurality of beams, wherein each beam is associated with a corresponding synchronization signal block (SSB), and wherein a physical downlink control channel (PDCCH) paging monitoring occasion (PMO) is associated with a preceding SSB.

The apparatus comprises controlling circuitry configured to cause determination—while the UE is in a non-connected mode—of a subset of the plurality of beams related to one or more beams previously associated with the UE, transmission of the corresponding SSB for each beam of the plurality of beams, and paging of the UE only in PDCCH PMO:s associated with the corresponding SSB:s of the beams of the subset.

A fourth aspect is a network node comprising the apparatus of the third aspect.

In some embodiments, any of the above aspects may additionally have features identical with or corresponding to any of the various features as explained above for any of the other aspects.

Generally, a paging monitoring occasion (PMO) may be exemplified by a paging occasion (PO) instantiation. For example, a paging occasion (PO) may be as defined in third generation partnership project (3GPP) specifications (e.g., for new radio, NR, Rel-15).

Also generally, that a subset of the plurality of beams is related to one or more beams previously associated with the UE may be exemplified by one or more of: the subset comprising the one or more beams previously associated with the UE, the subset comprising some of the one or more beams previously associated with the UE, and the subset comprising one or more neighboring beams to those previously associated with the UE.

An advantage of some embodiments is that alternative approaches to paging of a terminal device in a wireless communication network are provided.

An advantage of some embodiments is that signaling overhead may be improved (e.g., decreased) compared to other paging approaches.

An advantage of some embodiments is that throughput may be improved (e.g., increased) compared to other paging approaches.

An advantage of some embodiments is that power, and/or energy, consumption of UE and/or network node may be improved (e.g., decreased) compared to other paging approaches.

An advantage of some embodiments is that a number of paging false alarm events may be improved (e.g., decreased) compared to other paging approaches.

An advantage of some embodiments is that a number of SSB:s considered as feasible may be improved (e.g., increased) compared to other paging approaches.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where alternative approaches to paging of a terminal device in a wireless communication network are provided.

Figure 1:
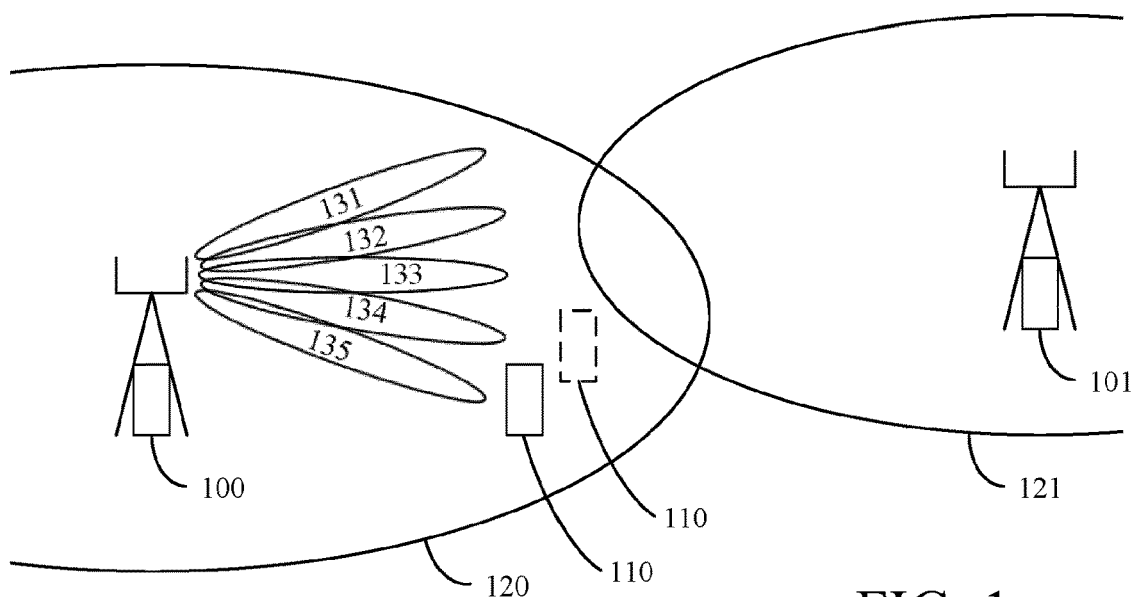
FIG. 1 is a schematic drawing illustrating an example scenario according to some embodiments.

FIG. 1 schematically illustrates an example scenario according to some embodiments, wherein a user equipment (UE) 110 is located within a coverage area of a cell 120 of a wireless communication network. The cell 120 is provided by a network node 100 and a neighboring cell 121 is provided by another network node 101 of the wireless communication network. The network node is configured for beam-formed transmission of a plurality of beams, which is schematically illustrated in FIG. 1 by beams 131, 132, 133, 134, 135.

Each beam of the plurality of beams may be associated with (e.g., configured to transmit) a corresponding synchronization signal block (SSB). For example, in new radio release 15 (NR Rel-15), multiple SSB:s may be configured per cell, spatially covering different regions to improve signal quality compared to a single SSB in a cell. The SSB:s may be transmitted in an SSB burst fashion.

The SSB may, for example, comprise a primary synchronization signal (PSS), a secondary synchronization signal (SSS), and a physical broadcast channel (PBCH).

In some setups, the SSB may be indicative of paging particulars (e.g., information that there is a paging occasion, PO, subsequent to the SSB, timing information of the PO, etc.). In some setups, the SSB is not indicative of any paging particulars. In some setups, the SSB is not directly indicative of any paging particulars, but provides a pointer to where paging configuration information may be found.

A paging occasion typically comprises paging radio network temporary identifier, P-RNTI, physical downlink control channel, PDCCH, and physical downlink shared channel, PDSCH; wherein the PDCCH includes (e.g., constitutes) a paging indicator, PI. In some embodiments, the PDCCH scrambled with P-RNTI is an indicator that a paging message follows.

In many wireless communication networks (e.g., NR Rel-15), the paging signaling of a paging occasion is specified to have a quasi-colocation (QCL) relation with an SSB in a cell. This typically means that a UE that receives an SSB with a certain receiver configuration can rely on that the same spatial receiver configuration and time/frequency offsets will be valid for the paging reception in the PO. In practice, this may manifest by each SSB being accompanied by a paging transmission. Thereby, each configured PO may be instantiated as many times as there are SSB:s in the cell. Each such PO instantiation will be termed a physical downlink control channel (PDCCH) paging monitoring occasion (PMO). Thus, a PDCCH PMO is associated with a preceding SSB in some embodiments.

In some network implementations, a UE is paged in the entire radio network association (RNA) under consideration.

In some network implementations, the network keeps track of the last known cell for each UE (also when it is in a non-connected mode, such as an idle mode or an inactive mode) and initially pages only in that cell to reduce the overall paging load in the network. If there is no paging response (e.g., because the UE has moved to another cell), the UE is thereafter paged in neighboring cells and/or in the entire RNA according to a paging escalation approach.

When multiple SSB:s per cell are configured (e.g., in NR), paging is—throughout a paging process such as that defined above—typically transmitted for each of the configured SSB:s due to the QCL. This leads to a high paging transmission load in the cell as a whole, since the same paging message is repeated in multiple PO instantiations.

Furthermore, the QCL relationship between SSB and paging—and the resulting multiplicative factor for PO—typically reduces the number of SSB that are considered to be feasible in typical network deployments. Being able to have a finer granularity SSB allocation might be desirable from beam management and/or mobility considerations.

Another problem resulting from the QCL is that—due to the large amount of transmitted pages—there may be a high rate of paging false alarms, wherein a paging false alarm may be defined as a UE demodulating a PO transmission only to conclude that it was not paged with that PO transmission.

Various embodiments may solve one or more of these problems; typically without violating QCL requirements.

Figure 2:
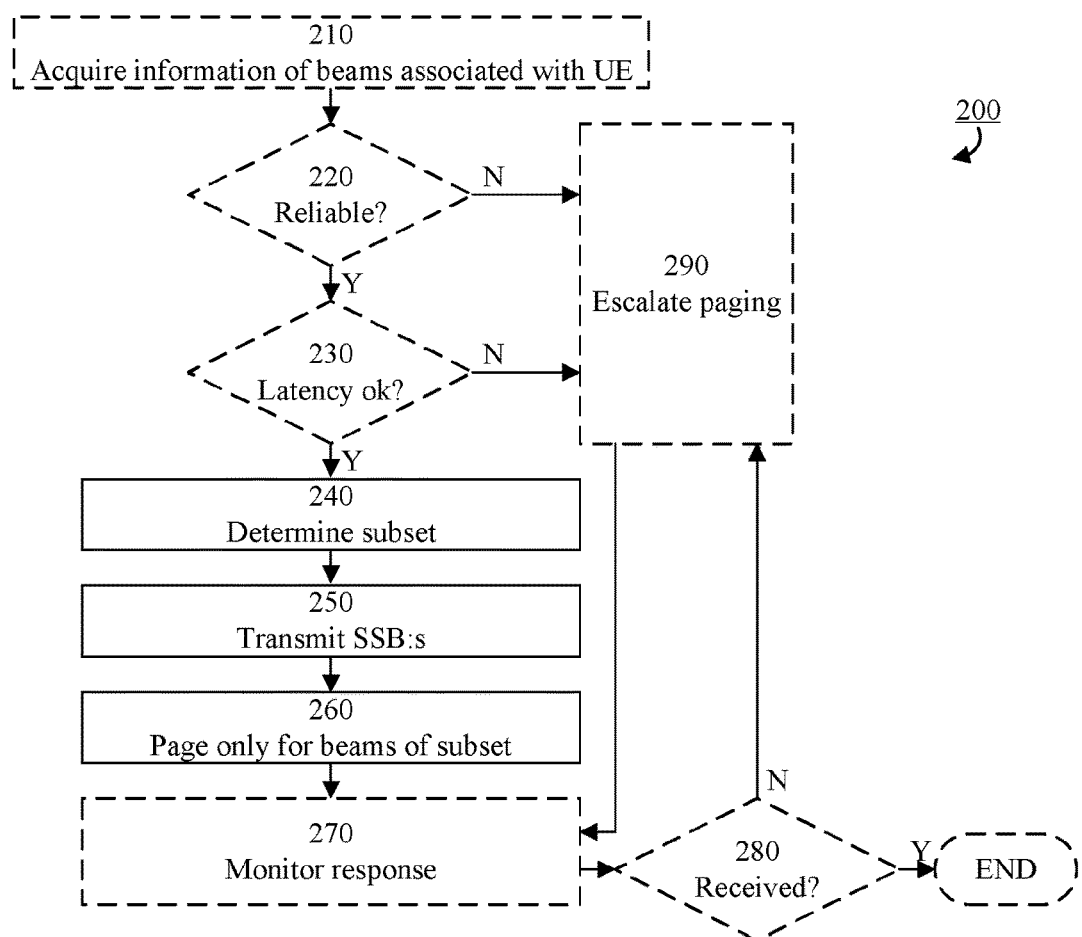
FIG. 2 is a flowchart illustrating example method steps according to some embodiments.

FIG. 2 illustrates an example method 200 according to some embodiments. The method 200 is a method of paging a UE by a network node, wherein the network node is configured for beam-formed transmission of a plurality of beams. For example, the method 200 may be performed by the network node 100 of FIG. 1, and may be for paging the UE 110 of FIG. 1.

The plurality of beams may relate to (e.g., comprise) all available beams of the cell, or may relate to (e.g., comprise) a sub-group of the available beams of the cell.

Each beam of the plurality of beams is associated with a corresponding synchronization signal block (SSB). For example, each beam may be configured to transmit the corresponding SSB.

Typically, there may be a one-to-one association between beams and SSB:s. Alternatively, two or more beams of the plurality may be associated with the same corresponding SSB.

In a typical scenario, the network node may be configured to perform a beam sweep, in which beams carrying corresponding associated SSB:s are activated in successive time resources.

Furthermore, a physical downlink control channel (PDCCH) paging monitoring occasion (PMO) is associated with a preceding SSB.

As illustrated by optional step 210, the method may start by acquiring information indicative of one or more beams associated with the UE. Step 210 is typically performed while the UE is in a connected mode.

Acquiring information indicative of one or more beams associated with the UE may be according to any suitable approach. For example, acquiring information indicative of one or more beams associated with the UE may comprise receiving an access request from the UE, wherein the access request is associated with the corresponding SSB of the one or more beams associated with the UE. Alternatively or additionally, acquiring information indicative of one or more beams associated with the UE may comprise receiving a measurement report from the UE, wherein the measurement report indicates the one or more beams associated with the UE. Measurement reports may, for example, relate to one or more of radio resource measurements (RRM), beam management (BM) measurements, and channel quality measurements such as channel state information (CSI) measurements, and/or may be indicative of a corresponding SSB and/or a CSI reference signal setting. Yet alternatively or additionally, acquiring information indicative of one or more beams associated with the UE may comprise performing channel measurements and/or beam measurements on sounding reference signal (SRS) transmissions from the UE and exploiting channel reciprocity.

The one or more beams associated with the UE may generally be a beam previously used, and/or indicated as preferred, for the UE. Additionally, one or more beams neighboring to a beam previously used, and/or indicated as preferred, for the UE may be included in the beams associated with the UE.

Later—while the UE is in a non-connected mode—a subset is determined of the plurality of beams (or, typically equivalently, a subset of a plurality of corresponding SSB:s), as illustrated by step 240. Typically the subset excludes at least one of the plurality of beams. For example, the subset may comprise one, two, three, or more beams.

Also typically, the subset should comprise beams that have a high probability (e.g., exceeding a probability threshold value) to be heard by the UE. For example, the network may determine/estimate which SSB:s the UE can receive and/or is likely to use for tracking of a camping cell, and use these SSB:s to determine the subset (e.g., let the subset comprise the corresponding beams). If a UE has accessed the network via the same beam during multiple connections and/or has reported similar beam qualities for some beams, the network may consider those beams as having a high probability of being reliably received by the UE.

When the UE is in a non-connected mode, the network node (or the network for that matter) may not be definitely aware of the location of the UE and/or through which resources (e.g., cells, beams, etc.) the UE can be reached.

In some embodiments, this is solved by determining the subset based on one or more beams previously associated with the UE (e.g., using the information indicative of one or more beams associated with the UE acquired in optional step 210).

For example, the subset may comprise, or consist of, the one or more beams previously associated with the UE. Additionally, one or more beams neighboring to beam(s) previously associated with the UE may be included in the subset.

In relation to FIG. 1, the UE 110 may—during execution of step 210—be in a position indicated by the dashed UE 110. Thus, the acquired information in step 210 might indicate beam 134 as associated with the UE 110. Then, the subset might be determined in step 240 to comprise beam 134, and possibly also the neighboring beams 133, 135. Even if the UE, which is now in un-connected mode, has re-located slightly—to a position indicated by the non-dashed UE 110—there is a high probability that it will be reached by a page using beam 134, and an even higher probability that it will be reached by a page using beam 135.

In some embodiments, the determination of the subset is based (only) on most recent information about beam(s) associated with the UE.

In some embodiments, the determination of the subset is based on information about beam(s) associated with the UE for several previous occasions. For example, the subset may comprise all beams associated with the UE during a specified duration of time, or may comprise one or more beams most often associated with the UE during a specified duration of time. This approach typically results in higher reliability and/or robustness than if only the most recent information about beam(s) associated with the UE is used.

Thus, in some embodiments, the determination of the subset may be based on recent activity of the UE (e.g., network access patterns—such as a stationary UE that consistently accesses the network in the same SSB of the same cell, and/or UE reporting—such as a stationary UE reporting consistent SSB and/or CSI-RS qualities for a set of best beams in the cell).

In some embodiments, the determination of the subset is transparent to the UE.

In step 250—while the UE is in a non-connected mode—the corresponding SSB for each beam of the plurality of beams is transmitted, e.g., in the form of a beam sweep.

In step 260—while the UE is in a non-connected mode—the UE is paged only in PDCCH PMO:s associated with the corresponding SSB:s of the beams of the subset. Thus, paging in other PDCCH PMO:s is omitted. This may provide for lower signaling overhead and/or higher throughput than other paging approaches.

When the UE has been paged, the method may comprise monitoring reception of paging response from the UE (according to any suitable method), as illustrated by optional step 270. If a paging response is received (Y-path out from optional step 280), the UE is successfully paged and the method 200 may be considered concluded.

If no paging response is received—e.g., within a time duration specified for paging response—(N-path out from optional step 280) the paging may be escalated as illustrated by optional step 290. Paging escalation typically comprises repeating SSB transmission (compare with step 250), and paging (compare with step 260), but performing the paging using more resources (e.g., beams, cells, etc.). Step 290 may be followed by the monitoring step 270 as described above.

For example, if no paging response is received the UE may be paged in one or more PDCCH PMO:s associated with corresponding SSB:s of the beams of the plurality not comprised in the subset, as well as beams comprised in the subset.

More generally, paging escalation may comprise paging for larger subset of the plurality of beams, paging for the full plurality of beams, paging for an entire cell (e.g., the cell 120 of FIG. 1 and/or the cell where the UE was most recently know to be located), paging for more than one cell (e.g., the cells 120, 121 of FIG. 1), or paging for an entire location area (LA).

In some embodiments, paging escalation may comprise successive escalation through one or more of the above examples. For example, it may be determined based on a suitable condition whether to escalate directly from subset to entire location area; or to escalate from subset to entire cell first, and then to entire location area if the cell paging fails. A suitable condition may, for example, comprise whether a latency requirement allows a delay resulting from the maximum number of paging attempts.

In connection with step 240 (e.g., before as illustrated in FIG. 2), one or more suitable conditions (illustrated by optional steps 220, 230) may be tested to conclude whether or not to proceed with paging for a subset of beams.

Some examples of suitable conditions relate to reliability of the paging for the subset of beams, as illustrated by optional step 220, and to a latency requirement, as illustrated by optional step 230. In various embodiments, only one of these example conditions may be applied, these example conditions may be applied together, only one of these example conditions may be applied in combination with one or more other suitable conditions, these example conditions may be applied together and in combination with one or more other suitable conditions, or only one or more other suitable conditions may be applied.

If it is determined to not proceed with paging for the subset of beams (N-paths out from 220, 230), the method 200 may proceed directly to the paging escalation of step 290.

If it is determined to proceed with paging for the subset of beams (Y-paths out from 220, 230), the method 200 may proceed to steps 240, 250, 260 and execute as described above.

Thus, step 220 may comprise determining whether the beams previously associated with the UE fulfill a reliability condition, and performing the paging in relation to the subset responsive to the beams previously associated with the UE fulfilling the reliability condition.

The reliability condition may typically relate to determining whether there is enough acquired information available about beam(s) previously associated with the UE and/or whether the available information is conclusive enough.

For example, step 220 may comprise determining whether there is information available about beam(s) previously associated with the UE which has been acquired more recently than defined by an expiry time threshold, and proceeding to step 240 only if so.

Alternatively or additionally, step 220 may comprise determining whether the information available about beam(s) previously associated with the UE is conclusive, and proceeding to step 240 only if so. For example, it may be considered that the information is conclusive when the same beam is associated with the UE for a specified number of acquisitions (e.g., during a specified time window). Alternatively or additionally, it may be considered that the information is conclusive when the same beam is associated with the UE for a majority of a specified number of acquisitions.

Step 230 may comprise determining whether a paging priority and/or a paging latency requirement allows a paging latency which exceeds a latency threshold value, and performing the paging in relation to the subset responsive to the paging priority and/or the paging latency requirement allowing the paging latency exceeding the latency threshold value.

For example, step 230 may comprise determining whether paging the UE has high priority, and proceeding to step 240 only if not so.

Alternatively or additionally, step 230 may comprise determining whether paging the UE is urgent (e.g., if a paging response needs to be received within some certain time), and proceeding to step 240 only if not so.

The paging latency requirement may, for example, comprise that an expected (e.g., average, worst case, etc.) paging latency should be less than the latency threshold value for the method to proceed to step 240. The expected paging latency may be estimated based on paging history statistics, for example. The latency threshold value may be static or dynamic, and may depend on, for example, a type of service triggering the paging.

Other suitable conditions may relate to UE power status (e.g., whether the UE is in a sleep mode for some SSB transmissions and does not monitor paging), network resources (e.g., whether traffic is low enough such that overhead signaling is not considered problematic), and channel conditions (e.g., whether a previously associated beam has deteriorating channel conditions such that a page using that beam is less likely to be heard). For example, it may be determined to not proceed to step 240 when the channel conditions are not stable (e.g., when a quality metric, such as a signal-to-interference ratio (SIR), has a variance that exceeds a variance threshold).

Typically, the paging approach according to some embodiments is transparent to the UE. However, in some embodiments, the UE may derive over time how (over which beams; association with access requests and/or measurements reports) it is paged. Based on that knowledge, the UE may choose to only monitor paging on beams where it is likely to be paged. Such an approach may enable more time in sleep mode for the UE than if it were to monitor paging on all beams; which may in turn decrease power consumption.

Thus, in some embodiments, a method for a UE of monitoring paging from a network node is provided, wherein the network node is configured for beam-formed transmission of a plurality of beams, wherein each beam is associated with a corresponding SSB, and wherein a PDCCH—PMO is associated with a preceding SSB.

The method comprises deriving a relation between PDCCH PMO:s in which the UE is paged and information indicative of one or more beams associated with the UE, and monitoring paging only in PDCCH PMO:s related to one or more beams previously associated with the UE.

In some embodiments, a corresponding apparatus for a UE may be provided, and a UE comprising the apparatus. The apparatus comprises controlling circuitry configured to cause derivation of a relation between PDCCH PMO:s in which the UE is paged and information indicative of one or more beams associated with the UE, and monitoring of paging only in PDCCH PMO:s related to one or more beams previously associated with the UE.

To exemplify these embodiments, the UE can monitor network behavior over time with regard to beam-selective paging to learn the network paging behavior. For example, the UE may notice that the network consistently pages the UE in relation to the beam(s)/SSB(s) that the UE has used for network access. Then, the UE may decide to ignore monitoring paging in relation to beams/SSB:s that it has never or rarely used to access the network.

This opens the possibility for the UE to choose a low power mode instead of being awake to monitor paging for some periods.

For robustness, the UE may consider a slightly larger beam set for paging monitoring than inferred from the network access pattern. For example, the UE may include beams adjacent to the ones it has used for network access.

To avoid completely missing pages (e.g., due to potential misalignment between UE and network), the UE may consider occasionally monitoring paging in all the configured beams/SSB:s. For example, the UE may monitor paging in all the configured beams for every second (or third, or fourth, etc.) PO. Alternatively or additionally, the UE may monitor paging in all the configured beams when channel conditions have changed, or are expected to change (e.g., when the UE is mobile).

In some embodiments relating to step 210 and 220, the network may send probing signals to the UE to trigger provision of the information indicative of one or more beams associated with the UE for the acquisition of step 210. The probing signals may be sent for a (e.g., random) selection of beams, for example, or for all beams.

This approach may be particularly useful when there is no (or too little) available information indicative of one or more beams associated with the UE and/or when available information indicative of one or more beams associated with the UE is not considered reliable (compare with step 220).

When a response (or a sufficient number of responses) is received from the UE, providing the information indicative of one or more beams associated with the UE, the probing procedure may be stopped. When no response (or a non-sufficient number of responses) is received from the UE, the probing procedure may be continued—possibly varying or expanding the selection of beams used for the probing.

Figure 3:
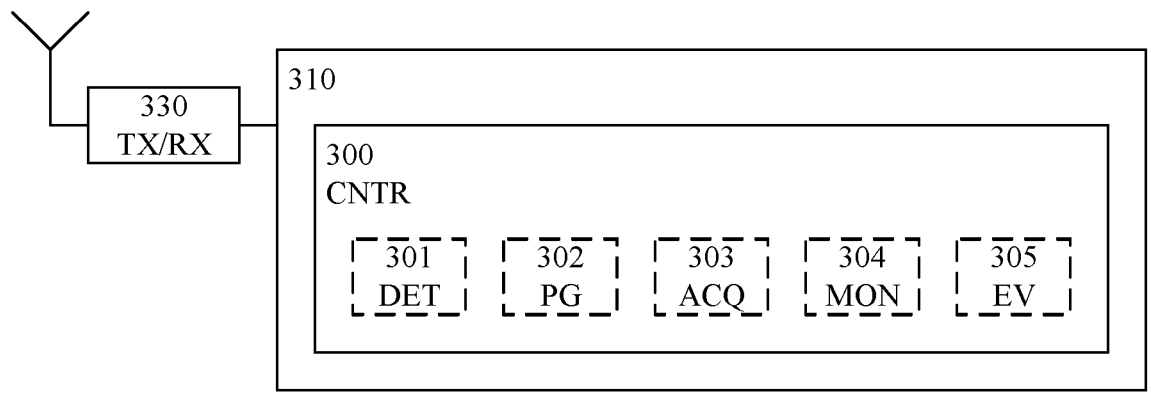
FIG. 3 is a schematic block diagram illustrating an example apparatus according to some embodiments.

FIG. 3 schematically illustrates an example apparatus 310 according to some embodiments. The apparatus may be comprised (or comprisable) in a network node (e.g., a radio access node, a base station, a gNodeB, an eNodeB, an access point, or similar). For example, the apparatus 310 may be configured to perform one or more steps of the method 200 of FIG. 2 and/or may be comprised in the network node 100 of FIG. 1.

The apparatus 310 is for paging a UE by a network node, wherein the network node is configured for beam-formed transmission of a plurality of beams. Each beam of the plurality of beams is associated with a corresponding synchronization signal block (SSB). Furthermore, a physical downlink control channel (PDCCH) paging monitoring occasion (PMO) is associated with a preceding SSB. The apparatus comprises a controller (CNTR; e.g., controlling circuitry or a control module) 300.

The controller is configured to cause determination—while the UE is in a non-connected mode—of a subset of the plurality of beams related to one or more beams previously associated with the UE (compare with step 240 of FIG. 2).

To this end, the controller may comprise or be otherwise associated with (e.g., connected, or connectable, to) a determiner (DET; e.g., determination circuitry or a determination module) 301. The determiner may be configured to determine—while the UE is in a non-connected mode—the subset of the plurality of beams related to one or more beams previously associated with the UE.

The controller is also configured to cause transmission of the corresponding SSB for each beam of the plurality of beams (compare with step 250 of FIG. 2).

To this end, the controller may comprise or be otherwise associated with (e.g., connected, or connectable, to) a transmitter (TX; e.g., transmission circuitry or a transmission module), illustrated in FIG. 3 as part of a transceiver 330. The transmitter may be configured to transmit the corresponding SSB for each beam of the plurality of beams.

The controller is also configured to cause paging of the UE only in PDCCH PMO:s associated with the corresponding SSB:s of the beams of the subset (compare with step 260 of FIG. 2).

To this end, the controller may comprise or be otherwise associated with (e.g., connected, or connectable, to) a pager (PG; e.g., paging circuitry or a paging module) 302. The pager may be configured to page the UE (using the transmitter) only in PDCCH PMO:s associated with the corresponding SSB:s of the beams of the subset.

The controller may be further configured to cause acquisition—while the UE is in a connected mode—of information indicative of one or more beams associated with the UE (compare with step 210 of FIG. 2) and use of the information to determine the subset.

To this end, the controller may comprise or be otherwise associated with (e.g., connected, or connectable, to) an acquirer (ACQ; e.g., acquisition circuitry or an acquisition module) 303. The acquirer may be configured to acquire the information indicative of one or more beams associated with the UE, and provide it to the determiner 301 for use in the determination described above.

As mentioned before, acquisition of information indicative of one or more beams associated with the UE may comprise reception of an access request from the UE and/or reception of a measurement report from the UE.

To this end, the controller may comprise or be otherwise associated with (e.g., connected, or connectable, to) a receiver (RX; e.g., reception circuitry or a reception module), illustrated in FIG. 3 as part of the transceiver 330. The receiver may be configured to receive the access request from the UE and/or the measurement report from the UE, and provide it to the acquirer 303.

The controller may be further configured to cause monitoring of reception of paging response from the UE (compare with step 270 of FIG. 2) and paging escalation responsive to no paging response being received (compare with steps 280, 290 of FIG. 2).

To this end, the controller may comprise or be otherwise associated with (e.g., connected, or connectable, to) a monitor (MON; e.g., monitoring circuitry or a monitoring module) 304. The monitor may be configured to monitor reception of paging response from the UE and instruct the pager 302 to escalate paging responsive to no paging response being received.

The controller may be further configured to cause evaluation of one or more suitable conditions (compare with steps 220, 230 of FIG. 2) to conclude whether or not to proceed with paging for a subset of beams.

To this end, the controller may comprise or be otherwise associated with (e.g., connected, or connectable, to) an evaluator (EV; e.g., evaluation circuitry or an evaluation module) 305. The evaluator may be configured to evaluate the one or more suitable conditions and instruct the pager 302 to accordingly; e.g., as described in connection to FIG. 2.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node.

Embodiments may appear within an electronic apparatus (such as a network node) comprising arrangements, circuitry, and/or logic according to any of the embodiments described herein. Alternatively or additionally, an electronic apparatus (such as a network node) may be configured to perform methods according to any of the embodiments described herein.

Figure 4:
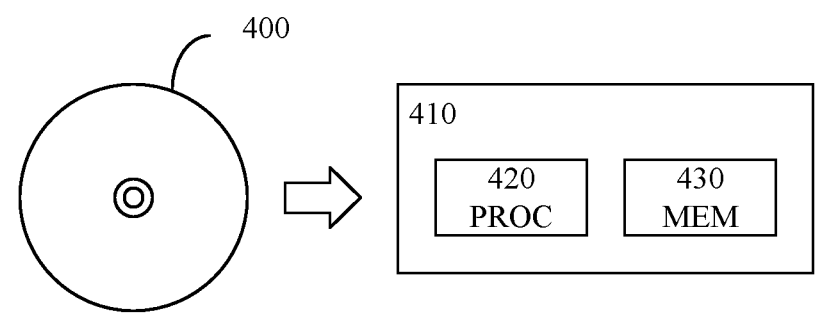
FIG. 4 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 4 illustrates an example computer readable medium in the form of a compact disc (CD) ROM 400. The computer readable medium has stored thereon a computer program comprising program instructions. The computer program is loadable into a data processor (PROC; e.g., data processing circuitry or a data processing unit) 420, which may, for example, be comprised in a network node 410. When loaded into the data processor, the computer program may be stored in a memory (MEM) 430 associated with or comprised in the data processor. According to some embodiments, the computer program may, when loaded into and run by the data processor, cause execution of method steps according to, for example, any of the methods as illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method of paging a user equipment (UE) by a network node, the network node being configured for beam-formed transmission of a plurality of beams, each beam being associated with a corresponding synchronization signal block (SSB), and a physical downlink control channel (PDCCH) paging monitoring occasion (PMO) being associated with a preceding SSB, the method comprising:
   determining, while the UE is in a non-connected mode, a subset of the plurality of beams related to one or more beams previously associated with the UE;
   transmitting the corresponding SSB for each beam of the plurality of beams;
   paging the UE only in PDCCH PMOs associated with the corresponding SSB:s of the beams of the subset;
   monitoring reception of paging response from the UE; and
   when no paging response is received, paging the UE in one or more PDCCH PMOs associated with corresponding SSBs of the beams of the plurality not comprised in the subset and neighboring a beam previously used by the UE.

2. The method of claim 1, further comprising:
   acquiring, while the UE is in a connected mode, information indicative of one or more beams associated with the UE; and
   using the information to determine the subset.

3. The method of claim 2, wherein acquiring information indicative of one or more beams associated with the UE comprises receiving an access request from the UE, wherein the access request is associated with the corresponding SSB of the one or more beams associated with the UE.

4. The method of claim 2, wherein acquiring information indicative of one or more beams associated with the UE comprises receiving a measurement report from the UE, wherein the measurement report indicates the one or more beams associated with the UE.

5. The method of claim 1, further comprising:
determining whether the beams previously associated with the UE fulfill a reliability condition; and
performing the paging in relation to the subset responsive to the beams previously associated with the UE fulfilling the reliability condition.

6. The method of claim 1, further comprising:
determining whether a paging priority and/or a paging latency requirement allows a paging latency which exceeds a latency threshold value; and
performing the paging in relation to the subset responsive to the paging priority and/or the paging latency requirement allowing the paging latency exceeding the latency threshold value.

7. A computer program product comprising a non-transitory computer readable medium, having thereon a computer program comprising program instructions, the computer program being loadable into a data processing unit of a network node configured for beam-formed transmission of a plurality of beams, each beam being associated with a corresponding synchronization signal block (SSB), and a physical downlink control channel (PDCCH) paging monitoring occasion (PMO) being associated with a preceding SSB, the computer program, when run by the data processing unit, causing the network node to:
determine, while the UE is in a non-connected mode, a subset of the plurality of beams related to one or more beams previously associated with the UE;
transmit the corresponding SSB for each beam of the plurality of beams;
page the UE only in PDCCH PMOs associated with the corresponding SSB:s of the beams of the subset;
monitor reception of paging response from the UE; and
when no paging response is received, page the UE in one or more PDCCH PMOs associated with corresponding SSB:s of the beams of the plurality not comprised in the subset and neighboring a beam previously used by the UE.

8. A network node for paging a user equipment (UE), the network node being configured for beam-formed transmission of a plurality of beams, each beam being associated with a corresponding synchronization signal block (SSB), and a physical downlink control channel (PDCCH) paging monitoring occasion (PMO) being associated with a preceding SSB, the network node comprising controlling circuitry configured to:
determine, while the UE is in a non-connected mode, a subset of the plurality of beams related to one or more beams previously associated with the UE;
transmit the corresponding SSB for each beam of the plurality of beams;
page the UE only in PDCCH PMOs associated with the corresponding SSB:s of the beams of the subset;
monitor reception of paging response from the UE; and
when no paging response is received, page the UE in one or more PDCCH PMOs associated with corresponding SSB:s of the beams of the plurality not comprised in the subset and neighboring a beam previously used by the UE.

9. The network node of claim 8, wherein the controlling circuitry is further configured to:
acquire, while the UE is in a connected mode, information indicative of one or more beams associated with the UE; and
use the information to determine the subset.

10. The network node of claim 9, wherein the controlling circuitry configured to acquire information indicative of one or more beams associated with the UE by receiving an access request from the UE, wherein the access request is associated with the corresponding SSB of the one or more beams associated with the UE.

11. The network node of claim 9, wherein the controlling circuitry configured to acquire information indicative of one or more beams associated with the UE by receiving a measurement report from the UE, wherein the measurement report indicates the one or more beams associated with the UE.

12. The network node of claim 8, wherein the controlling circuitry is further configured to:
determine whether the beams previously associated with the UE fulfill a reliability condition; and
perform the paging in relation to the subset responsive to the beams previously associated with the UE fulfilling the reliability condition.

13. The network node of claim 8, wherein the controlling circuitry is further configured to:
determine whether a paging priority and/or a paging latency requirement allows a paging latency which exceeds a latency threshold value; and
perform the paging in relation to the subset responsive to the paging priority and/or the paging latency requirement allowing the paging latency exceeding the latency threshold value.

* * * * *